United States Patent Office 3,231,501
Patented Jan. 25, 1966

3,231,501
CORROSION AND FOAM INHIBITED SINGLE PHASE ANTIFREEZE COMPOSITIONS
Robert R. Reese, Austin, Tex., assignor to Jefferson Chemical Company, Inc., Houston, Tex., a corporation of Delaware
No Drawing. Filed July 20, 1962, Ser. No. 211,393
6 Claims. (Cl. 252—74)

This application is a continuation-in-part of copending Robert R. Reese application Serial No. 831,726, filed August 5, 1959, and entitled "Antifreeze" now abandoned.

This invention relates to novel corrosion and foam inhibited single phase antifreeze compositions and equeous solutions thereof. The invention also concerns a method of producing the novel antifreezes and their aqueos solutions. In addition, the invention covers a method of preventing corrosion of metals which come in contact with such compositions.

It is well known that the uninhibited aqueous antifreeze solutions may cause corrosion of metals during service. These antifreeze mixtures have a corrosive effect on brass, copper, solder, steel, cast iron and cast aluminum in heat exchange apparatus such as the cooling systems of internal combustion engines. The latter four metals are particularly susceptible to corrosion by antifreeze mixtures.

A large number of corrosion inhibitors and combinations thereof have been employed by the prior art in antifreeze compositions. The antifreezes having the inhibitor dissolved only in the freezing point depressant and without any oil layer are known as single phase antifreezes, and those which have inhibitors dissolved in a separate oil layer are known as the two phase antifreezes. Although many of the prior art inhibited antifreezes are generally satisfactory, they are often deficient in one or more aspects. For example, they may, when used as a coolant in automobile cooling systems, deteriorate the rubber radiator hose, creep, foam, form scums and/or fail to provide adequate corrosion protection. Furthermore, those of the two phase type cannot be readily shipped in bulk because of the difficulty of recovering small quantities of the product with the proper proportion of oil and glycol.

An object of this invention is to provide novel antifreeze compositions and aqueous solutions thereof which afford superior corrosion protection to metals normally found in heat exchange apparatus. Another object is to provide an anitfreeze which is non-foaming, scum-resistant, resistant to creep and does not deteriorate rubber. Still another object is to provide an antifreeze which is a simple preparation and which may be shipped in large volume bulk containers such as drums or tank cars.

In accordance with this invention and the object thereof, I have discovered a single phase antifreeze composition and aqueous solutions thereof comprising a water soluble liquid freezing point depressant and from about 0.8 to about 5 weight (wt.) percent, based on the weight of the freezing point depressant, of a synthetic mixture, from about 10 to about 90 wt. percent of a sodium borate and, correspondingly, from about 90 to about 10 wt. percent of a megnesium borate, such antifreeze composition providing superior corrosion protection to metals normally found in heat exchange systems; such antifreeze composition being foam-resistant, scum-resistant, compatible with rubber hosing and of simple preparation.

In addition, I have found that within the limits set forth above, mixtures of a sodium borate with a magnesium borate can be provided which act synergistically in combination in the novel antifreeze compositions to retard the corrosion of brass, copper, steel, solder, cast iron and cast alumuinum. This synergistic action is particularly desirable since a substantial portion of the automobile cooling systems of today comprise one or more of these metals.

The freezing point depressants of my novel compositions are any of the water miscible liquid alcohols such as monohydroxy lower alkyl alcohols and the liquid polyhydroxy alcohols such as the alkylene and dialkylene glycols. Specific examples of the alcohols contemplated herein are methanol, ethanol, propanol, isopropanol, butanol, ethylene glycol, diethylene glycol, propylene glycol, butylene glycol, and mixtures thereof. The freezing point depressant should generally constitute between about 10 and 100 volume (vol.) percent of the novel antifreeze composition. A preferred glycol is ethylene glycol, which as sold commercially, often contains a small amount up to 10% by weight of diethylene glycol. The term ethylene glycol as used herein is intended to read either on the pure or commercial compound. This is also true of the other freezing point depressant alcohols contemplated herein.

As heretofore mentioned, I have discovered that a sodium borate when mixed with a magnesium borate in the proper proportions will provide a mixture which, in combination with a freezing point depressant, will act synergistically to retard corrosion of metals. In general, it is desirable to use from about 0.8 to about 5 wt. percent of the mixture of sodium borate and magnesium borate, based on the weight of the inhibited freezing point depressant. In general, the relative proportion of sodium borate to magnesium borate will be such that the desired synergistic effect is obtained. In general, the desired synergistic effect will be obtained when the mixture of sodium borate with magnesium borate contains from about 10 to about 90 wt. percent of sodium borate and, correspondingly, from about 90 to about 10 wt. percent of magnesium borate. It is to be understood that the synergistic effect is obtainable within this range, but that it is not necessarily obtainable under the entire range for every mixture of a sodium borate with a magnesium borate. In particular, in the synergistic mixture, a mixture of sodium metaborate with magnesium metaborate, the mixture should contain at least about 25 to about 90 wt. percent of the magnesium metaborate and, correspondingly, from about 75 to about 10 wt. percent of the sodium metaborate.

I include within the definition of magnesium borate both the tetraborate and metaborate forms thereof. I also include within the definition both the hydrous and anhydrous forms. Specific examples of the magnesium borates contemplated herein are magnesium tetraborate, magnesium metaborate and hydrates of these magnesium borates and mixtures thereof. In general, the quantity of magnesium borate to be employed in the novel antifreeze should be an amount sufficient to synergistically cooperate with the sodium borate that is present to give the desired result. This amount may be as little as 0.08 wt. percent, based on the weight of the inhibited alcohol freezing point depressant and may be as much as about 5 wt. percent based on the weight of the inhibited alcohol freezing point depressant. A preferred magnesium borate is magnesium metaborate, and the magnesium metaborate is preferably employed in an amount within the range from about 0.1 to about 1 wt. percent based on the inhibited alcohol freezing point depressant.

I include within the definition of sodium borate the tetraborate, the metaborate, as well as the hydrous and anhydrous forms thereof and mixtures. Specific examples of sodium borates contemplated herein are sodium tetraborate, sodium tetraborate decahydrate (Borax), sodium tetraborate pentahydrate and sodium metaborate. The quantity of sodium borate to be employed in the novel antifreeze should be sufficient to act synergistically with the magnesium metaborate and may be as little as 0.08 wt. percent and as much as 5 wt. percent, based on the weight of the inhibited alcohol freezing point depressant. A preferred sodium borate is sodium tetraborate and the amount of sodium tetraborate employed is preferably within the range of about 1 to about 4 wt. percent, based on the weight of the inhibited alcohol freezing point depressant, and more preferably between the range of about 2 to about 3.5 wt. percent, based on the weight of the inhibited alcohol freezing point depressant.

Among the metals to be protected by the disclosed novel antifreeze composition are brass, copper, steel, solder, cast iron and cast aluminum.

Water may be combined with the antifreeze composition of this invention in any and all proportions to form the aqueous antifreeze solutions thereof. When aqueous solutions of the novel antifreeze are to be used as coolants in automotive cooling systems, the water miscible liquid alcohol freezing point depressant should generally constitute at least about 10 vol. percent, preferably between about 20 and 65 vol. percent of the aqueous antifreeze solution. The corresponding water content should therefore constitute less than about 90 vol. percent, preferably between about 35 and 80% by volume of the aqueous antifreeze solution.

It is to be noted the freezing point of the aqueous antifreeze coolants is determined substantially by the relative component quantities and the particular freezing point depressant used therein. For example, in an aqueous ethylene glycol solution a minimum freezing point of approximately −60° F. is obtained with about 65% ethylene glycol by volume.

In the preparation of my novel antifreeze composition and the aqueous solutions thereof, the magnesium borate is conveniently formed in situ by adding boric acid and a magnesium oxide in a mol ratio of acid to oxide of between about 1.5:1 and 4.5:1 to a water soluble liquid alcohol. If formation of the metaborate is desired, the mol ratio is preferably maintained between 1.5:1 and 2.5:1 and if the tetraborate is desired, the mol ratio should be maintained between 3.5:1 and 4.5:1. The resultant solution is mixed at a temperature of between about 50° and 250° F., preferably between about 130° and 200° F., until a clear, homogeneous solution is formed. This in situ reaction is normally conducted under atmospheric pressure. However, if the reaction temperature exceeds the boiling point of the freezing point depressant, superatmospheric pressure is applied to maintain the freezing point depressant in a liquid state. In addition to the formation of the magnesium borate product, water is also an incidental product of the reaction. Water, however, is not an essential ingredient of the antifreeze concentrate as far as corrosion inhibition and anti-foam properties are concerned. To the resultant solution, sodium metaborate is added as a solid or an alcohol solution with mixing and the mixing is continued until visual observation reveals a homogeneous product. The sodium metaborate may also be formed in situ. If desired, water may then be added to the antifreeze concentrate to form aqueous solutions thereof.

It has been further discovered in accordance with the present invention that even though visual observation indicates that the mixture of sodium borate, magnesium borate and freezing point depressant is homogeneous, a still more beneficial effect is obtained with respect to corrosion protection if the composition is filtered through a fine filter having filtering openings within the range of about 0.5 to about 80 microns prior to dilution with water.

The following examples and tables serve to illustrate the invention in greater detail:

EXAMPLE I

This example illustrates a method of preparing the novel antifreeze composition.

To 3,775 grams (g.) of commercial ethylene glycol (4.1% by weight diethylene glycol content) and 250 g. water, which was continuously stirred during the entire time of antifreeze preparation, there was added 170 g. of boric acid and the resultant mixture was heated. When a temperature of 124° F. was reached, 30 g. of magnesium oxide was added to the stirred mixture and mixture temperature was increased and held between 170° and 190° F. for 1.5 hours. To the resultant solution, 775 g. of sodium tetraborate pentahydrate was added and stirring was continued until a clear homogeneous solution was formed. The preceding quantities produced approximately 5,000 g. of antifreeze concentrate to which was added 45,000 g. of ethylene glycol, resulting in 50,000 g. or 11.7 gallons of finished antifreeze.

The final product was of the following composition:

| Ingredient: | Weight percent |
| --- | --- |
| Ethylene glycol | 97.55 |
| Magnesium tetraborate | 0.25 |
| Sodium tetraborate | 1.07 |
| Water | 1.13 |

EXAMPLE II

This example illustrates the corrosion inhibiting effectiveness of the antifreeze compositions of this invention. In addition, the example illustrates the synergistic corrosion inhibiting action of the sodium borate—magnesium borate inhibitor combination in the novel antifreeze compositions.

The corrosion test employed and which is described below simulates conditions under which corrosion of oxidizable metals is frequently encountered in automotive engine cooling systems containing antifreeze compositions.

The test was conducted in an open top Pyrex glass cell of cylindrical shape fitted with a sidearm tube having an entrance into the middle section and an entrance into the bottom section of the cell. In addition, an air inlet tube was connected into the middle section of the sidearm tube and an air outlet tube was fitted to the upper side of the cell. The size of the cell was such that when 150 milliliters (mls.) of liquid was added thereto, the liquid's surface level was flush with the bottom entrance of the sidearm tube attached in the middle of the cell.

One hundred fifty mls. of 25% by volume antifreeze solution in water was charged to the cell. The water used to dilute the antifreeze contained 200 parts per million by weight (p.p.m.) sodium chloride concentration. The solution was prepared by diluting 37.50 mls. of antifreeze to 150 mls. with the sodium chloride water. The air outlet tube was connected to a water-cooled condenser and the air inlet tube was connected to a compressed air source. The open top of the cell was closed with a new rolled cork through which was passed a glass rod ending in a glass hook. From the hook a bundle of weighed test metal strips of known surface area was suspended by a Nichrome wire. The test bundle comprised clear and weighed test metal strips of brass, copper, solder, steel, cast iron and cast aluminum removably mounted on a brass bolt and individually spaced with brass washers. The bolt was tightened with a brass nut to hold the test metal strips rigid. This arrangement galvanically coupled the individual metal strips to one another. The surface areas of these test metals were in approximately the same relative proportion to one another as they would be in a representative automotive cooling system. The ratio of test metal surface area to coolant was also approximately the same as in an automotive cooling system.

The glass rod was adjusted so that the test metal strips were immersed in the test solution. The glass cell was then placed in a water bath maintained at a temperature of 175° F. ±2° F., and air was passed through the air inlet tube at a rate of 50 mls./min. into the portion of the test solution located in the sidearm tube, thereby promoting the circulation of the test solution in the cell. The air was previously scrubbed free of any carbon dioxide by passing it through a 10% aqueous sodium hydroxide solution. The cell was maintained in the water bath for a period of 161 hours whereupon the tested metal strips were removed. Each test metal strip was freed of corrosion products, dried and reweighed. The weight loss was calculated on the basis of milligram loss per square decimeter of original surface area of the test strip (mg./sq. dcm.).

The metal specimens were prepared for test by degreasing in hot benzene vapor for 30 minutes. Solder specimens were then stored in a dessicator before being scrubbed, dried and weighed. Other metals were etched as follows:

(1) Brass and copper—immersed 15 seconds in a solution of 3 volumes of concentrated nitric acid and 1 volume of glacial acetic acid.

(2) Steel—dipped 20 minutes in 4 N-sulfuric acid at 175°–185° F., rinsed in hot (180° F.) water and scrubbed with a bristle brush under water.

(3) Cast iron—treated the same as steel.

(4) Cast aluminum—5 minutes in 10 wt. percent solution of sodium hydroxide at 122°–140° F., scrubbed with a bristle brush and rinsed in water and dipped in concentrated nitric acid for 5 seconds.

After etching, the strips were rinsed well in distilled water and acetone, wiped with a clean dry cloth and dried in an oven at 140° F. for 10 to 15 minutes. The strips were then cooled in a dessicator and weighed. The test metal specimens were prepared immediately before test and in no case more than 24 hours in advance of the initiation of the test.

Following completion of the test, the strips were scrubbed with a bristle brush in water to remove loosely adhering corrosion products. The cast iron strips were then immersed for 5 minutes in an aqueous solution at room temperature of 50% hydrochloric acid containing 2% rosin amine corrosion inhibitor. All strips were then rinsed with water, scrubbed with a bristle brush and dried in an oven. After drying the strips were cooled in a dessicator and weighed. The correction factors for weight loss of the specimens due to the method of cleaning specified above are as follows:

Metals: Mg./sq. dcm.
  Brass _____ +3
  Copper _____ +3
  Solder _____ +13
  Steel _____ +3
  Cast iron _____ +114
  Cast aluminum _____ +3

Six antifreezes were subjected to the above test and were designated as Antifreeze A, B, C, D, E and F. Antifreeze A is an uninhibited ethylene glycol. Antifreeze B contains sodium tetraborate and Antifreeze C contains magnesium tetraborate. Antifreeze D, E and F are representative novel antifreeze compositions of this invention containing the sodium and magnesium borate combination.

Test data and results are reported below in Table I.

*Table I*

| Description | Antifreeze | | | | | |
|---|---|---|---|---|---|---|
| | A | B | C | D | E | F |
| Composition of Test Solution: | | | | | | |
| Antifreeze Component, mls | 37.5 | 37.5 | 37.5 | 37.5 | 37.5 | 37.5 |
| Water (200 p.p.m. NaCl), mls | 112.5 | 112.5 | 112.5 | 112.5 | 112.5 | 112.5 |
| Composition of Antifreeze Component, wt. percent: | | | | | | |
| Ethylene Glycol (commercial grade) | 100 | 97.5 | 96.71 | 97.55 | 97.55 | 97.66 |
| Magnesium Tetraborate | | | 1.41 | 0.25 | 0.13 | |
| Magnesium Metaborate | | | | | | 0.18 |
| Sodium Tetraborate | | 1.32 | | 1.07 | 1.19 | 1.09 |
| Sodium Metaborate | | | | | | |
| Total Water | | 1.18 | 1.88 | 1.13 | 1.13 | 1.07 |
| Corrosion Loss of Test Strips, mg./sq. dcm.: | | | | | | |
| Brass | 15 | 24 | 24 | 7 | 9 | 7 |
| Copper | 12 | 22 | 8 | 4 | 7 | 0 |
| Solder | 19 | 574 | 166 | 34 | 25 | 0 |
| Steel | 2,982 | 654 | 13 | 2 | 4 | 11 |
| Cast Iron | 2,268 | 1,035 | 118 | 0 | 0 | 128 |
| Cast Aluminum | 33 | 169 | 299 | 23 | 19 | 5 |

As can be seen from the above table, my novel inhibited compositions, Antifreezes D–F reduce the corrosion of brass, copper, steel, cast iron and cast aluminum. Although novel antifreeze representatives D and E had a somewhat higher corrosion loss for solder than the uninhibited antifreeze, the loss still remained low and was substantially lower than when sodium tetraborate and magnesium tetraborate were employed individually in an antifreeze.

A study of Table I also establishes the synergism, corrosionwise, of the sodium borate-magnesium borate combination in my novel antifreeze. For example, a comparison of the corrosion data for brass and cast aluminum shows the use of sodium borates and magnesium borates individually accelerated the corrosion of these metals while the combination of both substantially reduced the corrosion. In addition, a study of the corrosion data for all the metal test coupons shows that for the same or less total inhibitor amount the combination of a sodium borate and a magnesium borate decreases corrosion many fold (except possibly for cast iron in Antifreeze F) in comparison to the individual use of alkali metal and alkaline earth metal borates.

In addition to the above, 37.5 mls. of an antifreeze consisting of 96.35% ethylene glycol, 0.36% magnesium metaborate, 1.44% sodium metaborate and 1.85% water was diluted with 112.5 mls. of water having an NaCl concentration of 200 p.p.m. The resultant solution was subjected to the above described tests for copper and brass. No corrosion loss for copper was detected and the rate of corrosion for brass was only a 5 mg./sq. dcm.

EXAMPLE III

This example illustrates the foam resistant properties of the novel antifreeze composition. In addition, the superiority of the novel antifreeze over a known foam inhibited antifreeze is also demonstrated.

The foam test procedure consisted of adding 250 mls. of an antifreeze and 25 mls. of a foam and scum producing agent, designated as Agent X to an 800 ml. beaker. The beaker contents were then stirred with an electric mixer of the household variety operated at a speed of 1000 r.p.m. for a 100 second period while maintaining the test solution temperature at 160° F. At the instant the mixer was cut off, the foam height was measured and the time required for the foam to collapse was then observed. The foam collapse time is the interval between the cutting off of the mixer and the appearance of the first stable opening in the foam layer.

The composition of Agent X is as follows:

| Ingredients: | Wt. percent |
|---|---|
| Sodium sulfonate oil mixture | 16.0 |
| Gum rosin | 4.2 |
| Naphthenic acid | 7.1 |
| Sodium hydroxide (49% in $H_2O$) | 2.0 |
| Ethylene glycol monobutyl ether | 1.0 |
| Water | 0.9 |
| Lubricating oil (SUS viscosity of 70 at 100° F.) | 68.8 |

Two antifreeze formulations were subjected to the previously described foam test and were designated as Antifreezes G and H. Antifreeze G is representative of the novel antifreeze of this invention containing both sodium and magnesium borates and Antifreeze H is a comparative antifreeze containing only a sodium borate and a silicone antifoamant.

*Table II*

| Description | Antifreeze | |
|---|---|---|
| | G | H |
| Composition of Test Solution, Vol. Percent: | | |
| Water Component (distilled) | 75 | 75 |
| Antifreeze Component | 25 | 25 |
| Composition of Antifreeze Component, wt. percent: | | |
| Ethylene Glycol (Commercial Grade) | 97.5 | 97.5 |
| Magnesium Tetraborate | 0.25 | 0 |
| Sodium Tetraborate | 1.13 | 1.32 |
| Total Water | 1.12 | 1.18 |
| Silicone Antifoam,[1] p.p.m. | 0 | 50 |
| Foam Test: | | |
| Foam Height, Inches | 0 | 3.5 |
| Foam Collapse Time, Seconds | 0 | 50 |

[1] Dimethyl Silicone.

An inspection of the above foam tests results establishes the novel antifreeze composition represented by Antifreeze G does not foam or scum even in the presence of a foam and scum producing agent. The comparative foam inhibited Antifreeze H foamed in the presence of Agent X though containing one of the best known commercial antifoamants.

In other tests conducted on my novel antifreeze compositions in automobile engines, no deterioration of rubber radiator hosing was found nor was any creeping by the novel antifreeze observed.

EXAMPLE IV

An antifreeze formulation was prepared by the method described in Example I which contained about 97.90 wt. percent commercial ethylene glycol, about 0.28 wt. percent calcium tetraborate, about 1.12 wt. percent sodium tetraborate and about 0.70 wt. percent water.

The corrosivity of the thus prepared antifreeze formulation was then determined by the method described in columns 4, 5 and 6 of the specification.

It was found that the corrosion loss of test strips was as follows:

| Material: | Corrosion loss of test strips, mg./sq. dcm. |
|---|---|
| Brass | 26 |
| Copper | 18 |
| Solder | 155 |
| Steel | 794 |
| Cast iron | 641 |
| Aluminum | 447 |

EXAMPLE V

Experiments were performed to show the synergistic effect obtainable with sodium borates and magnesium borates.

Antifreeze formulations were prepared by the method described in Example I and the corrosivity of the thus prepared antifreeze formulations was then determined by the method described in columns 4, 5 and 6 of the specification. The formulations prepared and the results obtained were as follows:

*Table III.—Ratio of reactants used in preparations (wt. percent)*

| Formulation | A | B | C |
|---|---|---|---|
| Ethylene Glycol | 90.000 | 95.000 | 95.000 |
| Borax (Pentahydrate) | 2.765 | 1.194 | 0.198 |
| Sodium Hydroxide, 50% aqueous solution | 1.518 | 0.656 | 0.108 |
| Magnesium Oxide | 0.561 | 0.040 | 0.242 |
| Boric Acid | 3.440 | 0.247 | 1.487 |
| Water, Added | 1.716 | 2.863 | 2.965 |

*Table IV.—Theoretical composition (wt. percent)*

| Formulation | A | B | C |
|---|---|---|---|
| Ethylene Glycol | 90.000 | 95.000 | 95.000 |
| Sodium Metaborate | 2.500 | 1.080 | 0.180 |
| Magnesium Tetraborate | 2.500 | 0.180 | 1.080 |
| Water, Total | 5.000 | 3.740 | 3.740 |

*Table V.—Corrosion test results*

| Metal Specimen | Weight Loss, mg./sq. dcm. | | |
|---|---|---|---|
| | A | B | C |
| Brass | 3.0 | 3.0 | 9.0 |
| Copper | 5.0 | 3.0 | 4.0 |
| Solder | 74.0 | 85.0 | 7.0 |
| Steel | 3.0 | 506.0 | 0.0 |
| Iron | 115.0 | 848.0 | 104.0 |
| Aluminum | 0.0 | 77.0 | 0.0 |

As will be seen from Tables II and III above, Formulation B, which contains only a minor amount of magnesium tetraborate and a major amount of sodium borate, was significantly more corrosive than either Formulation A or Formulation C, which contain greater amounts of magnesium tetraborate and smaller amounts of sodium metaborate.

This illustrates that although it is possible to obtain a synergistic effect when the inhibited antifreeze contains from about 0.8 to about 5 wt. percent of a mixture of 10 to 90 wt. percent of a sodium borate with 90 to 10% of a magnesium borate, it does not necessarily follow that the synergistic effect is obtainable over the entire range for all of the experimental tests that are possible. This further illustrates that the synergistic qualities of sodium borate and magnesium borate will be within the above stated range and may readily be determined by experimentation. For example, the results of this Example V indicate that with compositions containing sodium metaborate and magnesium tetraborate, the magnesium metaborate component should be more than about 20 wt. percent, such as 30 wt. percent.

EXAMPLE VI

A series of formulations were prepared. In preparing each formulation, ethylene glycol was heated above 100° F. in a stirred vessel and boric acid was added with agitation and heated to a temperature of about 200° F., after which magnesia was added with agitation. Agitation was continued until the solution appeared completely clear. Thereafter, borax was added at a temperature in excess of about 200° F. with agitation, the amount of ingredients employed being sufficient to provide at the end of the reaction compositions containing 96.00 wt. percent of ethylene glycol, 2.736 wt. percent, 0.180 wt. percent magnesium metaborate and 1.084 wt. percent sodium tetraborate. In some of the compositions, sodium metaborate was substituted on an equivalent weight basis for sodium tetraborate and magnesium tetraborate was substituted for magnesium metaborate. The corrosivity of the thus prepared antifreeze formulation was then determined by the method described in columns 4, 5 and 6 of the specification. The formulations prepared and the results obtained are as follows:

*Table VI*

| Formulation | A | B | C | D |
|---|---|---|---|---|
| Ethylene Glycol (Commercial Grade) | 96.000 | 96.000 | 96.000 | 96.000 |
| Sodium Tetraborate | 1.084 | 1.084 | 1.084 | |
| Sodium Metaborate | | | | 1.084 |
| Magnesium Tetraborate | 0.180 | 0.180 | | |
| Magnesium Metaborate | | | 0.180 | 1.080 |
| Water | 2.736 | 2.736 | 2.736 | 2.736 |
| Corrosion Loss of Test mg./sq. dcm.: | | | | |
| Brass | 10 | 16 | 7 | 5 |
| Copper | 1 | 1 | 0 | 0 |
| Solder | 56 | 99 | 0 | 64 |
| Steel | 35 | 23 | 11 | 173 |
| Cast Iron | 4 | 0 | 128 | 136 |
| Cast Aluminum | 49 | 38 | 5 | 34 |

EXAMPLE VII

A formulation containing sodium tetraborate and magnesium metaborate was prepared in the proportions set forth above in Example VI. At the end of the preparation and while the antifreeze formulation was still at a temperature of about 200° F., a portion thereof was filtered through a line filter having an opening with an average diameter within the range of about 0.5 to about 1.1 microns. The formulations were tested for corrosivity and the results that were obtained are set forth below:

| | Weight Loss, mg./sq. dcm. | | | | | |
|---|---|---|---|---|---|---|
| | Brass | Copper | Solder | Steel | Iron | Aluminum |
| Unfiltered Formulation | 27 | 1 | 117 | 13 | 326 | 30 |
| Filtered Formulation | 16 | 5 | 131 | 1 | 0 | 4 |

Having thus described my invention, what is claimed is:

1. An aqueous coolant consisting essentially of between 90 and 0 vol. percent of water and between 10 and 100% by volume of an antifreeze composition comprising a water soluble liquid alcohol freezing point depressant and from about 0.8 to about 5 wt. percent of a corrosion inhibitor, based on the combined weight of said alcohol freezing point depressant and said corrosion inhibitor, said corrosion inhibitor containing a synergistically effective amount of a sodium borate and a magnesium borate within the range of from about 10 to about 90 wt. percent of sodium borate and from about 90 to about 10 wt. percent of magnesium borate.

2. An aqueous coolant consisting essentially of between about 20 and 65% by volume of an antifreeze composition comprising about 96 to about 99 wt. percent of ethylene glycol and from about 4 to about 1 wt. percent of a sodium borate and from about 0.1 to about 1 wt. percent of a magnesium borate, said sodium borate being present in synergistically effective amounts, the remainder of said composition being between 35% and 80% by volume of water.

3. An aqueous coolant in accordance with claim 2 wherein the sodium borate is sodium tetraborate and the magnesium borate is magnesium metaborate.

4. An antifreeze composition adapted to be added to water consisting essentially of a water soluble liquid alcohol freezing point depressant and from about 0.8 to about 5 wt. percent of a corrosion inhibitor, based on the combined weight of said alcohol freezing point depressant and said corrosion inhibitor, said corrosion inhibitor consisting of a synergistically effective amount of a sodium borate and a magnesium borate within the range of from about 10 to about 90 wt. percent of said sodium borate and from about 90 to about 10 wt. percent of said magnesium borate.

5. An antifreeze composition as in claim 4 wherein the corrosion inhibitor consists of from about 1 to about 4 wt. percent of said sodium borate and from about 0.1 to about 1 wt. percent of said magnesium borate.

6. An antifreeze composition as in claim 4 wherein the corrosion inhibitor consists of from about 1 to about 4 wt. percent of sodium tetraborate and from about 0.1 to about 1 wt. percent of magnesium metaborate.

References Cited by the Examiner

UNITED STATES PATENTS

| 2,803,603 | 8/1957 | Meighen | 252—75 |
| 2,834,735 | 5/1958 | Woodle et al. | 252—74 |
| 3,015,629 | 1/1962 | Truitt | 252—75 |
| 3,046,229 | 7/1962 | Cessna et al. | 252—74 |

JULIUS GREENWALD, *Primary Examiner.*